US012792217B2

(12) United States Patent
Lee et al.

(10) Patent No.: US 12,792,217 B2
(45) Date of Patent: Nov. 10, 2026

(54) STORAGE DEVICE, STORAGE DEVICE OPERATING METHOD, AND STORAGE SYSTEM

(71) Applicant: SAMSUNG ELECTRONICS CO., LTD., Suwon-si (KR)

(72) Inventors: Kyungduk Lee, Suwon-si (KR); Sangsoon Kim, Suwon-si (KR); Seungjun Oh, Suwon-si (KR); Youhwan Kim, Suwon-si (KR); Hoseong Ahn, Suwon-si (KR); Sanghwa Jin, Suwon-si (KR); Younsoo Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/025,244

(22) Filed: Jan. 16, 2025

(65) Prior Publication Data

US 2025/0291488 A1 Sep. 18, 2025

(30) Foreign Application Priority Data

Mar. 18, 2024 (KR) ........................ 10-2024-0037389

(51) Int. Cl.
*G06F 3/06* (2006.01)

(52) U.S. Cl.
CPC .......... *G06F 3/0611* (2013.01); *G06F 3/0653* (2013.01); *G06F 3/0659* (2013.01); *G06F 3/0679* (2013.01)

(58) Field of Classification Search
CPC .... G06F 3/0679; G06F 3/0653; G06F 3/0611; G11C 16/3427
See application file for complete search history.

(56) References Cited

U.S. PATENT DOCUMENTS 9,076,525 B2 7/2015 Kaneko et al.
9,141,534 B2 9/2015 D'Abreu et al.
(Continued)

FOREIGN PATENT DOCUMENTS

KR 10-2015-0096646 8/2015
KR 10-2022-0056906 5/2022
KR 10-2411026 6/2022

OTHER PUBLICATIONS

Extended European Search Report in European Appln. No. 25164362.3, mailed on Aug. 22, 2025, 9 pages.
(Continued)

*Primary Examiner* — Edward J Dudek, Jr.
(74) *Attorney, Agent, or Firm* — Fish & Richardson P.C.

(57) ABSTRACT

A method of operating a storage device including a storage controller and non-volatile memories is described. The method includes detecting a trigger event for application of a curing pulse, determining a voltage level of the curing pulse, and applying a curing command which instructs generation of the curing pulse according to the determined voltage level. After a read operation on a target word line is completed, the target word line is expected not to be accessed for more than a predefined period of time. The trigger event corresponds to an event in which a block includes such as target word line. The curing pulse corresponds to a voltage pulse applied to at least one word line in a block or sub-block including the target word line on which the read operation has been performed. The voltage level of the curing pulse is less than a read voltage.

20 Claims, 17 Drawing Sheets

(56) References Cited

U.S. PATENT DOCUMENTS

| | | | | |
|---|---|---|---|---|
| 10,061,647 | B2 | 8/2018 | Shim et al. | |
| 2014/0226402 | A1 | 8/2014 | Duzly et al. | |
| 2015/0071008 | A1* | 3/2015 | Yang | G11C 16/0483 365/185.23 |
| 2015/0318045 | A1 | 11/2015 | Yun | |
| 2017/0365349 | A1* | 12/2017 | Pang | G11C 16/24 |
| 2020/0118637 | A1 | 4/2020 | Natarajan et al. | |
| 2021/0241812 | A1 | 8/2021 | Kurosawa et al. | |
| 2022/0129199 | A1 | 4/2022 | Song et al. | |
| 2022/0415406 | A1* | 12/2022 | Masuduzzaman | G11C 16/26 |
| 2023/0343400 | A1* | 10/2023 | Guo | G11C 16/3459 |
| 2023/0410920 | A1* | 12/2023 | Chen | G11C 16/0483 |
| 2025/0037773 | A1* | 1/2025 | Lu | G11C 16/26 |
| 2025/0046386 | A1* | 2/2025 | Yuan | G11C 16/26 |

OTHER PUBLICATIONS

Office Action in European Appln. No. 25164362.3, mailed on Jul. 14, 2026, 6 pages.

* cited by examiner

STORAGE DEVICE, STORAGE DEVICE OPERATING METHOD, AND STORAGE SYSTEM

CROSS-REFERENCE TO RELATED APPLICATION

This application is based on and claims priority under 35 U.S.C. § 119 to Korean Patent Application Nos. 10-2024-0037389, filed on Mar. 18, 2024, in the Korean Intellectual Property Office, the disclosure of which is incorporated by reference herein in its entirety.

BACKGROUND

This disclosure relates to a memory device, and more particularly, to a storage device, a storage device operating method, and a storage system.

As non-volatile memory, flash memory may retain stored data even when power is turned off. Recently, storage devices including the flash memory, such as an embedded multi-media card (eMMC), a universal flash storage (UFS), a solid state drive (SSD), and a memory card, have been widely used, and these storage devices are useful for storing or transmitting large amounts of data.

As the generation of vertical NAND (VNAND) evolves, the numbers of stacked word lines WL and string selection lines SSL increase for efficiency of dies. For performance, NAND operating conditions are set to reduce read/program/erase time and power consumption.

As the generation of VNAND evolves, the number of word lines to which voltage has to be applied tends to increase due to the increase in the number of stacked word lines. Accordingly, during this operation, the time/power required to set/recover the voltage of the word lines increase. However, since the increase in time/power has a trade-off relationship with performance, there is a need to shorten the time required for recovery after the end of the read/program operation in order to maximize the performance.

SUMMARY

This disclosure provides a storage device for applying a curing pulse for recovery of a non-selected word line, a storage controller, and a method of operating the storage controller.

According implementations, there is provided a method of operating a storage device including a storage controller and non-volatile memories, the method including detecting a trigger event for application of a curing pulse, determining a voltage level of the curing pulse, and applying a curing command instructing generation of the curing pulse according to the determined voltage level, wherein the trigger event corresponds to an event in which a block including a target word line is expected not to be accessed for more than a predefined period of time after a read operation on the target word line is completed, the curing pulse corresponds to a voltage pulse applied to at least one word line in a block or sub-block including the target word line on which the read operation has been performed, and the voltage level of the curing pulse is less than a read voltage.

According to implementations, there is provided a storage device including non-volatile memories and a storage controller including a pulse management circuit configured to detect a trigger event for application of a curing pulse, determine a voltage level of the curing pulse, and apply a curing command instructing generation of the curing pulse according to the determined voltage level, wherein the trigger event corresponds to an event in which a block including a target word line is expected not to be accessed for more than a predefined period of time after a read operation on the target word line is completed, the curing pulse corresponds to a voltage pulse applied to at least one word line in a block or sub-block including the target word line on which the read operation has been performed, and the voltage level of the curing pulse is less than a read voltage.

According to implementations, there is provided a storage system including a host device configured to generate a read command and a storage device configured to detect a trigger event for application of a curing pulse, determine a voltage level of the curing pulse, and apply a curing command instructing generation of the curing pulse according to the determined voltage level, wherein the trigger event corresponds to an event in which a block including a target word line is expected not to be accessed for more than a predefined period of time after a read operation on the target word line is completed, the curing pulse corresponds to a voltage pulse applied to at least one word line in a block or sub-block including the target word line on which the read operation has been performed, the voltage level of the curing pulse is less than a read voltage, and a pulse width of the curing pulse is less than that of a pulse applied to neighboring word lines according to the read command.

BRIEF DESCRIPTION OF THE DRAWINGS

Implementations will be more clearly understood from the following detailed description taken in conjunction with the accompanying drawings in which.

DETAILED DESCRIPTION

Hereinafter, implementations are described in detail with reference to the accompanying drawings.

Figure 1:
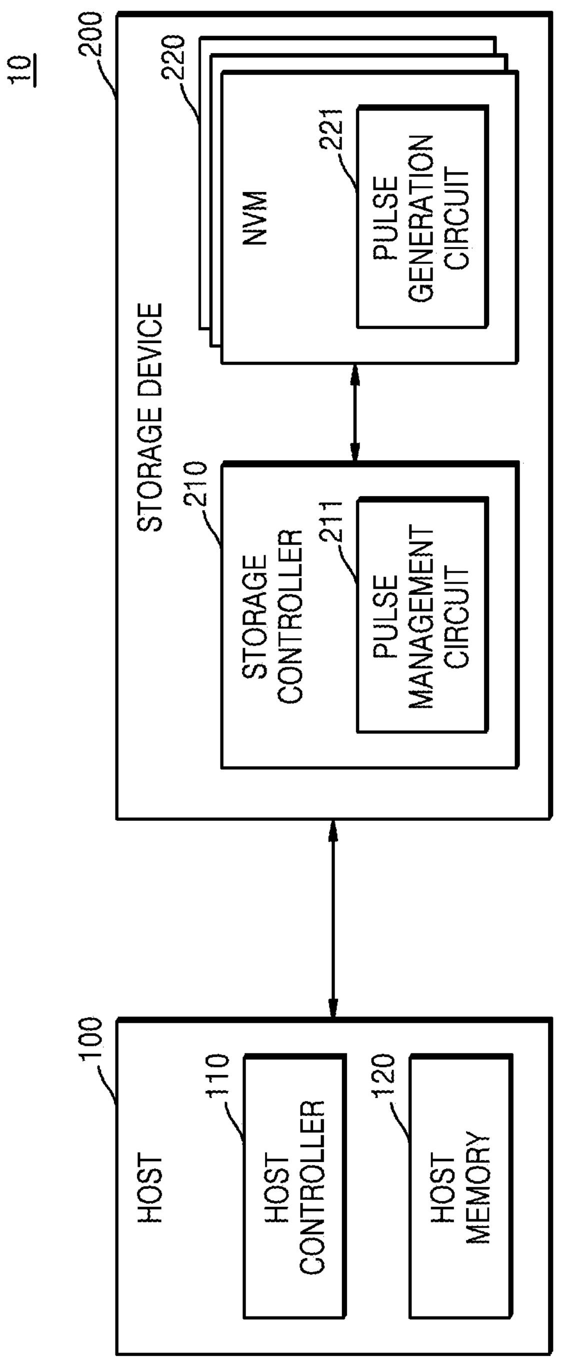
FIG. 1 is a block diagram showing a storage system according to implementations.

FIG. 1 is a block diagram showing a storage system 10 according to implementations.

Referring to FIG. 1, the storage system 10 may include a host 100 and a storage device 200. For example, the storage system 10 may be formed as an electronic device, such as a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, and an e-book. In addition, for example, the storage system 10 may be formed as other types of electronic devices, such as wearable devices including a wristwatch or a head-mounted display (HMD).

The host 100 may control data processing operations, for example, data read operations or data write operations, on the storage device 200. The host 100 may represent a data processing device capable of processing data, such as a central processing unit (CPU), a processor, a microprocessor, and an application processor (AP). The host 100 may run an operating system (OS) and/or various applications.

Specifically, the host 100 may include a host controller 110 and a host memory 120. The host controller 110 may be configured to control all operations of the host 100 or configured such that the storage device 200 is controlled by the host 100. The host memory 120 may include buffer memory, cache memory, or operating memory used in the host 100.

In some implementations, the host memory 120 may function as buffer memory for temporarily storing data to be transmitted to the storage device 200 or data transmitted from the storage device 200. The host 100 may transmit a request to the storage device 200 and receive a response from the storage device 200. For example, if the request involves a write request, this request may include write data. For example, if the request involves a read request, the response to the request may include read data.

In some implementations, the host 100 may apply a command to the storage device 200 so as to control the voltage of neighboring word lines adjacent to a target word line of the storage device 200. For example, the host 100 may apply a curing command to the storage device 200 so as to lower the high residual voltage of the neighboring word lines. The curing command may correspond to a command for applying a curing pulse having a voltage level lower than a read voltage to all word lines of a block corresponding to the target word line. This is described below in detail.

The storage device 200 may be operated under the control by the host 100. The storage device 200 may include a storage controller 210 and a non-volatile memory device 220. The storage controller 210 may perform various management operations to efficiently use the non-volatile memory device 220. The non-volatile memory device 220 may include a plurality of non-volatile memories NVM. Each of memory cells of the plurality of non-volatile memories NVM may correspond to a multi-level cell for storing at least two bits.

The storage device 200 may receive a request REQ from the host 100 and transmit a response RSP to the host 100. For example, if the request REQ involves a write request, the storage controller 210 may respond to the write request from the host 100 and control the non-volatile memory device 220 to write data on the non-volatile memory device 220. For example, if the request REQ involves a read request, the storage controller 210 may respond to the read request from the host 100 and control the non-volatile memory device 220 to read data stored in the non-volatile memory device 220.

When the non-volatile memory device 220 includes flash memory, the flash memory may include a 2D NAND memory array or a 3D (or vertical) NAND (VNAND) memory array. In another example, the storage device 200 may include other types of non-volatile memory. For example, the storage device 200 may include magnetic random access memory (MRAM), spin-transfer torque MRAM, conductive bridging RAM (CBRAM), ferroelectric RAM (FeRAM), phase RAM (PRAM), resistive RAM, and other types of memory.

The storage controller 210 may include a pulse management circuit 211. The pulse management circuit 211 may be provided as software, hardware, or a combination thereof. The pulse management circuit 211 may provide the non-volatile memory device 220 with a curing command for instructing an application of a curing pulse on the basis of a trigger event. The trigger event may include all events in which a block including a target word line is expected not to be accessed for a certain period of time after the read operation of the target word line is completed.

Each of the non-volatile memories NVM may include a pulse generation circuit 221. The pulse generation circuit 221 may be provided as software, hardware, or a combination thereof. The pulse generation circuit 221 may generate a curing pulse corresponding to the curing command received from the storage controller 210. For example, the pulse generation circuit 221 may control a voltage generator on the basis of the curing command and apply the curing pulse to the non-volatile memory device 220.

As described above, the storage device 200 may apply the curing pulse to the non-volatile memory device 220 to prevent on-cell disturbance of the non-volatile memory NVM.

For example, the storage device 200 may apply curing pulses to each of the blocks. The storage device 200 may apply a curing pulse at a voltage level lower than the read voltage level to all word lines of the block corresponding to the target word line. A neighboring word line that maintains a high voltage level after access to the target word line may be lowered to a voltage level of word line recovery on the basis of the curing pulse. Accordingly, a read disturbance may be suppressed by preventing a threshold voltage corresponding to a lower program state from rising to the right.

In another example, the storage device 200 may apply curing pulses to each of the sub-blocks. The storage device 200 may apply a curing pulse at a voltage level lower than the read voltage level to all word lines of a sub-block corresponding to the target word line. On the basis of the curing pulse, at least neighboring word lines adjacent to the target word line in the sub-block may be lowered to the voltage level of word line recovery. Accordingly, a read disturbance may be suppressed by preventing a threshold voltage corresponding to a lower program state from rising to the right.

In another example, the storage device 200 may apply a curing pulse to at least one word line. The at least one word line may include word lines located within certain positions from the target word line. The at least one word line may include edge word lines of a sub-block corresponding to the target word line (e.g., the top word line and bottom word line of the sub-block) or edge word lines of a block corresponding to the target word line (e.g., the top word line and bottom word line of the block).

Figure 2:
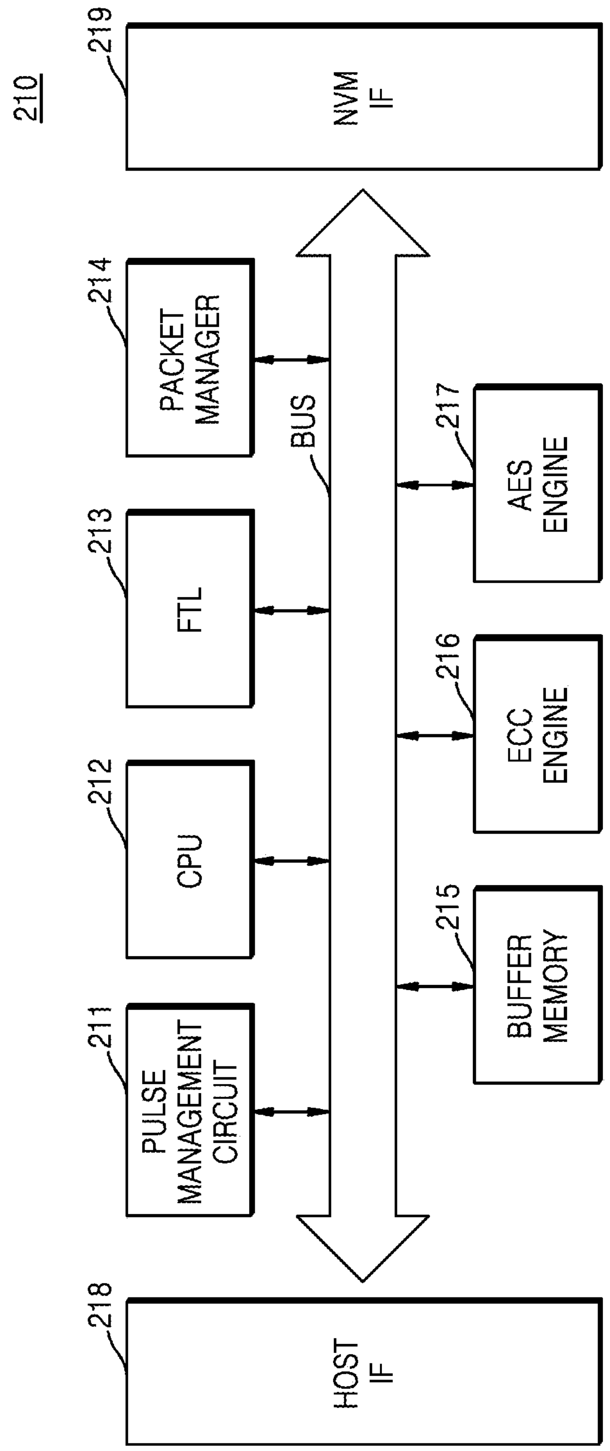
FIG. 2 is a block diagram showing a storage controller of FIG. 1.

FIG. 2 is a block diagram showing a storage controller 210 of FIG. 1.

Referring to FIGS. 1 and 2, the storage controller 210 may include a pulse management circuit 211, a CPU 212, a flash translation layer (FTL) 213, a packet manager 214, a buffer memory 215, an error correction code (ECC) engine 216, an advanced encryption standard (AES) engine 217, a host interface circuit 218, a non-volatile memory interface circuit 219, and a bus BUS.

The storage controller 210 may further include operating memory into which the FTL 213 is loaded. Also, as the CPU 212 operates the FTL, the data write operations and the data read operations on the non-volatile memory device 220 may be controlled.

In implementations, the CPU 212 may be provided as a multi-core processor, for example, as a dual-core processor or a quad-core processor. The pulse management circuit 211, the FTL 213, and the packet manager 214 may be loaded into the operating memory of the storage controller 210. For example, the operating memory may be provided as volatile memory, such as static random access memory (SRAM) and dynamic random access memory (DRAM), or non-volatile memory, such as flash memory and PRAM.

The FTL 213 may perform several functions, such as address mapping, wear-leveling, and garbage collection. The address mapping operation includes an operation that changes a logical address received from the host 100 into a physical address used to actually store data in the non-volatile memory device 220. The wear-leveling is related to technology for preventing excessive deterioration of specific blocks by ensuring that blocks in the non-volatile memory device 220 are used uniformly and may be performed by, for example, firmware technology that balances erase counts of physical blocks. The garbage collection is related to technology for securing usable capacity within the non-volatile memory device 220 by copying valid data of a block to a new block and then erasing the existing block.

The packet manager 214 may generate packets according to the protocol of the interface negotiated with the host 100 or parse various other types of information from packets received from the host 100. Also, the buffer memory 215 may temporarily store data to be written to the non-volatile memory device 220 or data to be read from the non-volatile memory device 220. The buffer memory 215 may be provided inside the storage controller 210 but may also be provided outside the storage controller 210.

The ECC engine 216 may perform error detecting and correcting functions on read data that is read from the non-volatile memory device 220. More specifically, the ECC engine 216 may generate parity bits for write data to be written to the non-volatile memory device 220, and the parity bits generated in this manner may be stored in the non-volatile memory device 220 together with the write data. When reading data from the non-volatile memory device 220, the ECC engine 216 may correct errors in the read data using parity bits read from the non-volatile memory device 220 together with the read data and may then output the read data with errors corrected.

The AES engine 217 may perform at least one of an encryption operation and a decryption operation on data, which is input to the storage controller 210, using a symmetric-key algorithm.

The host interface circuit 218 may transmit a packet to and receive a packet from the host 100. The packet transmitted from the host 100 to the host interface circuit 218 may include a command or data to be written to the non-volatile memory device 220, and the packet transmitted from the host interface circuit 218 to the host 100 may include a response to the command or data read from the non-volatile memory device 220.

The non-volatile memory interface circuit 219 may transmit data to be written to the non-volatile memory device 220 to the non-volatile memory device 220 or receive data read from the non-volatile memory device 220. The non-volatile memory interface circuit 219 may be configured to comply with standard regulations, such as Toggle or open NAND flash interface (ONFI).

The pulse management circuit 211 may provide the non-volatile memory device 220 with a curing command for instructing application of a curing pulse on the basis of a trigger event. The trigger event may include all events in which a block including a target word line is expected not to be accessed for a certain period of time after the read operation of the target word line is completed.

Figure 3:
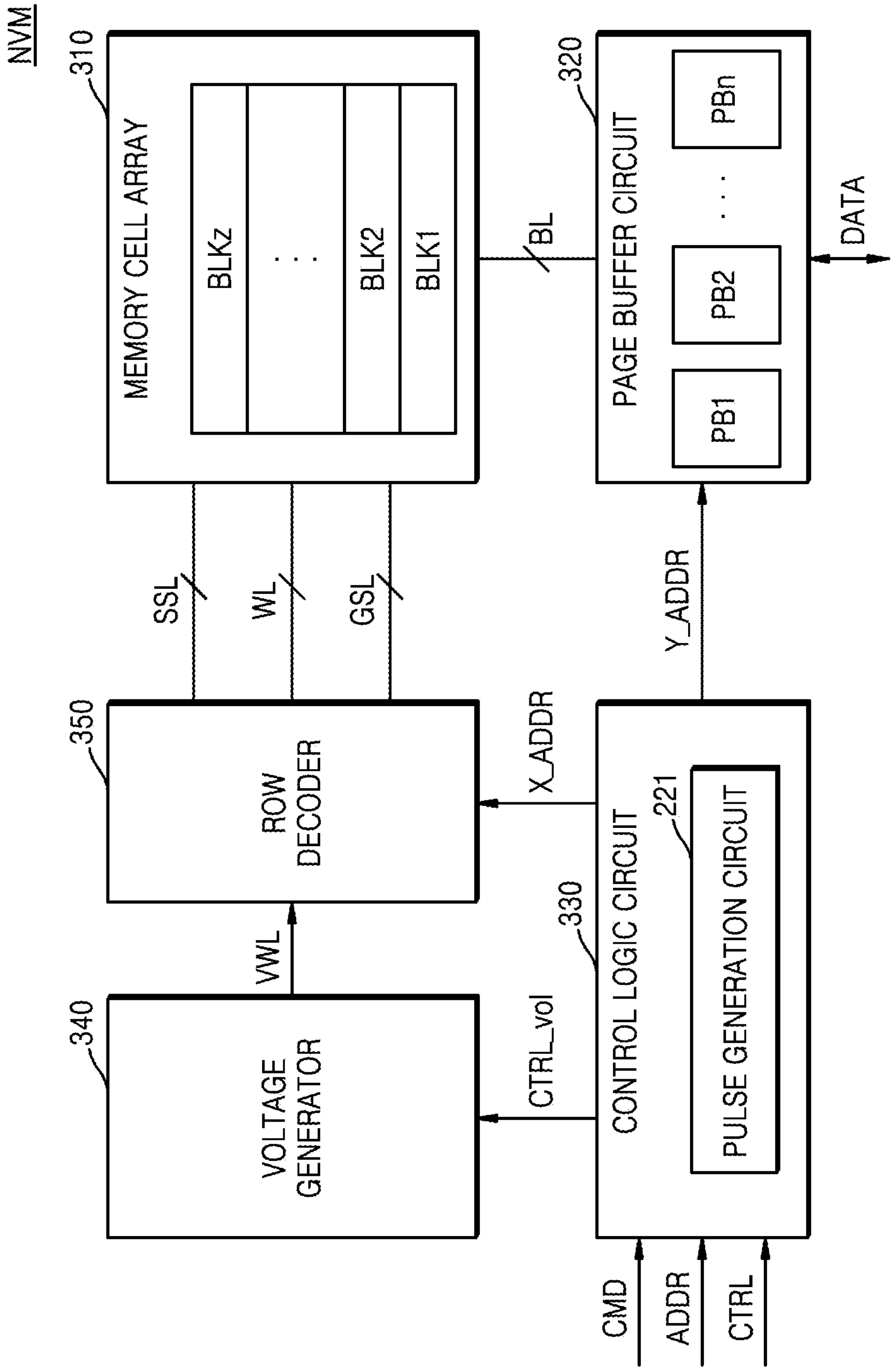
FIG. 3 is a block diagram showing a non-volatile memory of FIG. 1.

FIG. 3 is a block diagram showing a non-volatile memory NVM of FIG. 1.

Referring to FIGS. 1 and 3, the non-volatile memory NVM may include a memory cell array 310, a page buffer circuit 320, a control logic circuit 330, a voltage generator 340, and a row decoder 350. The non-volatile memory NVM may correspond to an example of the non-volatile memory NVM of FIG. 1. The non-volatile memory NVM may further include a column logic, a pre-decoder, a temperature sensor, a command decoder, an address decoder, or the like.

The memory cell array 310 may include a plurality of memory blocks BLK1 to BLKz, each of the plurality of memory blocks BLK1 to BLKz may include a plurality of cell strings, and the plurality of cell strings may include a plurality of memory cells connected in series. The memory cell array 310 may be connected to the page buffer circuit 320 via bit lines BL and may be connected to the row decoder 350 via word lines WL, string selection lines SSL, and ground selection lines GSL.

In implementations, the memory cell array 310 may include a three dimensional (3D) memory cell array, and the 3D memory cell array may include a plurality of cell strings. Each of the cell strings may include memory cells respectively connected to word lines vertically stacked on a substrate. Such vertically stacked memories are shown, for example, in the disclosures of U.S. Pat. Nos. 7,679,133, 8,553,466, 8,654,587, and 8,559,235 and US Application Publication No. 2011/0233648 which are incorporated by reference herein in their entireties.

In some implementations, the memory cell array 310 may include flash memory, and the flash memory may include a 2D NAND memory array or a 3D NAND (or VNAND) memory array. In some implementations, the memory cell array 310 may include MRAM, spin-transfer torque MRAM, CBRAM, FeRAM, PRAM, resistive RAM, and other types of memories.

The page buffer circuit 320 may include a plurality of page buffers PB1 to PBn (n is an integer of 3 or more), and the plurality of page buffers PB1 to PBn may be respectively connected to the memory cells via the plurality of bit lines BL. The page buffer circuit 320 may select at least one bit line from among the plurality of bit lines BL in response to a column address Y-ADDR. The page buffer circuit 320 may operate as a write driver or a sensing amplifier depending on an operation mode. For example, during a program operation, the page buffer circuit 320 may apply a bit line voltage corresponding to data to be programmed via the selected bit line. During a read operation, the page buffer circuit 320 may sense data stored in the memory cell by sensing the current or voltage of the selected bit line.

The control logic circuit 330 may control all various operations inside the non-volatile memory NVM. The control logic circuit 330 may output various control signals in response to a command CMD and/or an address ADDR. For example, the control logic circuit 330 may output a voltage control signal CTRL_vol, a row address X_ADDR, and the column address Y_ADDR.

In some implementations, the control logic circuit 330 may include the pulse generation circuit 221. The pulse generation circuit 221 may generate a curing pulse corresponding to the curing command received from the storage controller 210. For example, the pulse generation circuit 221 may control the voltage generator 340 on the basis of the curing command and apply the curing pulse to the non-volatile memory device 220.

The voltage generator 340 may generate various types of voltages to perform program, read, and erase operations on the basis of the voltage control signal CTRL_vol. For example, the voltage generator 340 may generate a program voltage, a read voltage, a program verification voltage, an erase voltage, or the like as a word line voltage VWL. For example, the voltage generator 340 may receive a control signal from the pulse generation circuit 221 of the control logic circuit 330 and generate a curing pulse according to the received control signal.

The row decoder 350 may select at least one of the plurality of word lines WL in response to the row address X_ADDR and may select one of the plurality of string selection lines SSL. For example, in a program operation, the row decoder 350 may apply word line voltages VWL to selected word lines during a search operation or a read operation.

Referring to FIGS. 1 and 3 together, the storage controller 210 may control the operation of non-volatile memory NVM. For example, the storage controller 210 may control the non-volatile memory NVM by providing a control signal CTRL and a data signal DQ to the non-volatile memory NVM via different signal lines or different signal pins.

For example, via different signal pins, the storage controller 210 may provide the non-volatile memory NVM with a chip enable signal CE/, a command latch enable signal CLE, an address latch enable signal ALE, a write enable signal WE/, a read enable signal RE/, a data strobe signal DQS, and a data signal DQ.

The chip enable signal CE/, the command latch enable signal CLE, the address latch enable signal ALE, the write enable signal WE/, the read enable signal RE/, and the data strobe signal DQS may belong to the control signal CTRL provided from the storage controller 210. The storage controller 210 may provide the control signal CTRL and the data signal DQ to the non-volatile memory NVM, thereby enabling the non-volatile memory NVM to perform various operations.

The storage controller 210 may provide a command CMD, an address ADDR, and data DATA to the non-volatile memory NVM via a data pin through which the data signal DQ is provided. The storage controller 210 may receive the stored data DATA from the non-volatile memory NVM via the data pin.

The storage controller 210 may transmit the data signal DQ to the non-volatile memory NVM to store the data DATA in the non-volatile memory NVM or output the data DATA from the non-volatile memory NVM. For example, the storage controller 210 may provide the command CMD, the address ADDR, and the data DATA to the non-volatile memory NVM to store the data DATA in the non-volatile memory NVM. For example, the storage controller 210 may provide the command CMD and the address ADDR to the non-volatile memory NVM to output the data DATA from the non-volatile memory NVM. The storage controller 210 may provide the control signal CTRL as well as the data signal DQ to the non-volatile memory NVM to store and output the data DATA.

The non-volatile memory NVM performs corresponding operations in response to the control signal CTRL and the data signal DQ provided from the storage controller 210. For example, the non-volatile memory NVM may receive the data signal DQ including the command CMD and the address ADDR from the storage controller 210 and transmit the stored data DATA to the storage controller 210.

On the basis of the control signal CTRL, the non-volatile memory NVM may identify which signal among the command CMD, the address ADDR, and the data DATA is provided via the data signal DQ. For example, the non-volatile memory NVM may distinguish types of data signals DQ on the basis of the chip enable signal CE/, the command latch enable signal CLE, the address latch enable signal ALE, the write enable signal WE/, the read enable signal RE/, and the data strobe signal DQS.

In response to various signals from the storage controller 210, the non-volatile memory NVM may store data received from the storage controller 210 or transmit the stored data to the storage controller 210. In some implementations, when performing the program operation or read operation under the control by the storage controller 210, the non-volatile memory NVM may provide a ready/busy (R/B) signal (or state information) to the storage controller 210. For example, the R/B signal may represent a ready state or a busy state. In response to the R/B signal, the storage controller 210 may identify that non-volatile memory NVM is operating. In implementations, when the R/B signal indicates a busy state, the storage controller 210 may not exchange information (commands, addresses, data, etc.) with the non-volatile memory NVM.

Figure 4A:
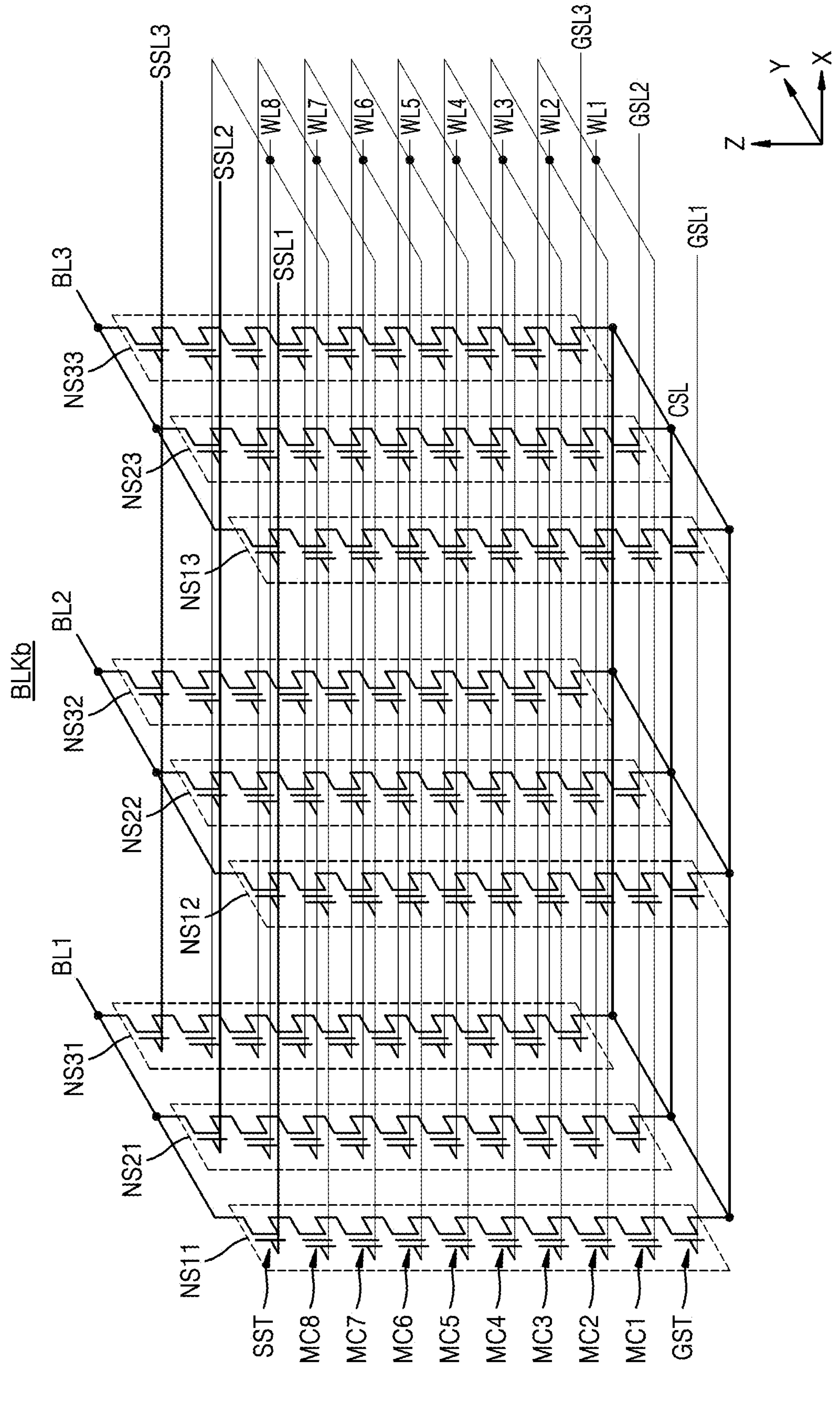
FIG. 4A is a circuit diagram showing an example of a memory block according to implementations.

FIG. 4A is a circuit diagram showing an example of a memory block BLKb according to implementations.

Referring to FIG. 4A, the memory block BLKb may include NAND flash memory having a vertical structure. The memory block BLKb may include a plurality of NAND strings NS11 to NS33, a plurality of word lines WL1 to WL8 (or referred to as first to eighth word lines WL1 to WL8), a plurality of bit lines BL1 to BL3 (or referred to as first to third bit lines BL1 to BL3), a plurality of ground selection lines GSL1, GSL2, and GSL3, a plurality of string selection lines SSL1 to SSL3 (or referred to as first to third string selection lines SSL1 to SSL3), and a common source line CSL. Here, the number of NAND strings, the number of word lines, the number of bit lines, the number of ground selection lines, and the number of string selection lines may vary according to implementations.

The NAND strings NS11, NS21, and NS31 may be provided between the first bit line BL1 and the common source line CSL, the NAND strings NS12, NS22, and NS32 may be provided between the second bit line BL2 and the common source line CSL, and the NAND strings NS13, NS23, and NS33 may be provided between the third bit line BL3 and the common source line CSL. Each of the NAND strings (e.g., NS11) may include a string selection transistor SST, a plurality of memory cells MC1 to MC8, and a ground selection transistor GST, which are connected to each other in series. Hereinafter, the NAND string is simply referred to as a string for convenience of description.

Strings connected in common to one bit line constitute one column. For example, the strings NS11, NS21, and NS31 connected in common to the first bit line BL1 may correspond to a first column, the strings NS12, NS22, and NS32 connected in common to the second bit line BL2 may correspond to a second column, and the strings NS13, NS23, and NS33 connected in common to the third bit line BL3 may correspond to a third column.

Strings connected to one string selection line constitute one row. For example, the strings NS11, NS12, and NS13 connected to the first string selection line SSL1 may correspond to a first row, the strings NS21, NS22, and NS23 connected to the second string selection line SSL2 may correspond to a second row, and the strings NS31, NS32, and NS33 connected to the third string selection line SSL3 may correspond to a third row.

The string selection transistors SST may be respectively connected to the string selection lines SSL1 to SSL3. The plurality of memory cells MC1 to MC8 are respectively connected to the word lines WL1 to WL8. The ground selection transistors GST may be respectively connected to the ground selection lines GSL1, GSL2, and GSL3. The string selection transistors SST are respectively connected to the bit lines BL, and the ground selection transistor GST is connected to the common source line CSL.

The word lines at the same height (e.g., WL1) are connected in common, and the string selection lines SSL1 to SSL3 are separated from each other. For example, when programming memory cells connected to the first word line WL1 and belonging to the strings NS11, NS12, and NS13, the first word line WL1 and the first string selection line SSL1 may be selected. In implementations, the ground selection lines GSL1, GSL2, and GSL3 may be separated from each other. In other implementations, the ground selection lines GSL1, GSL2, and GSL3 may be connected to each other.

Figure 4B:
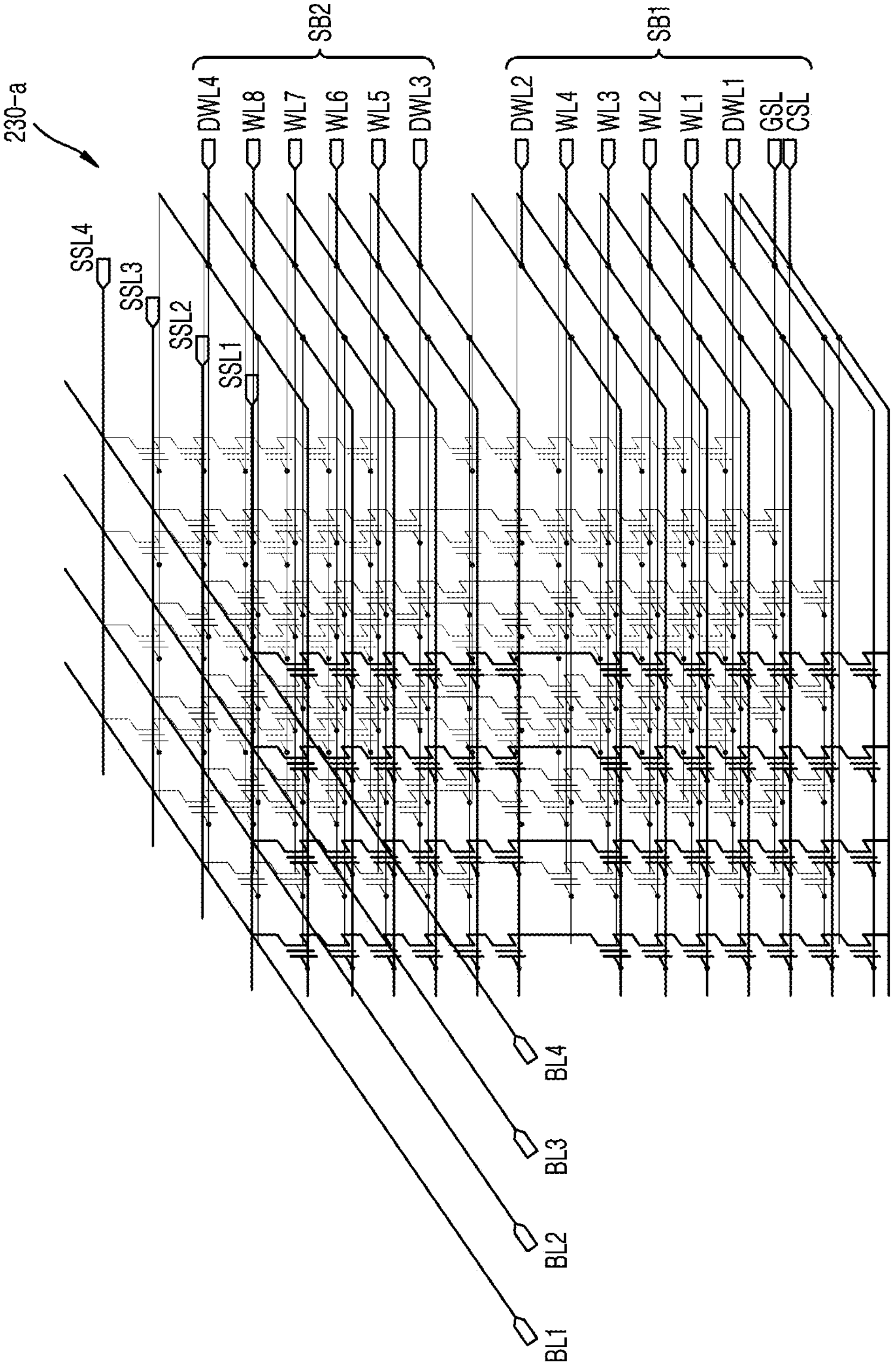
FIG. 4B is a circuit diagram showing an example of a memory block having a sub-block structure according to implementations.

FIG. 4B is a circuit diagram showing an example of a memory block having a sub-block structure according to implementations.

For case of description, it is assumed that the memory cell array has two sub-blocks, i.e., first and second sub-blocks, the sub-blocks have the same size, and the number of word lines in each of the sub-blocks is four. However, the memory cell array may have three or more sub-blocks. Also, these sub-blocks may all have the same size, or at least one sub-block may have a different size from at least one other of the sub-blocks. Also, the number of word lines in each sub-block is not limited to four and may have various values.

Referring to FIG. 4B, a cell array 230-*a* of a 3D non-volatile memory device may include two or more sub-blocks. The sub-blocks may be addressed independently from each other.

Also, the cell array of the 3D non-volatile memory device includes a plurality of strings, and each of the plurality of strings includes a plurality of non-volatile memory cells connected in series.

The cell array of the 3D non-volatile memory device of FIG. 4B is similar to the cell array of the 3D non-volatile memory device shown in FIG. 4A except that the cell array of the 3D non-volatile memory device of FIG. 4B is divided into at least two sub-blocks. Therefore, the description focuses on the differences therebetween without repeated descriptions thereof.

According to implementations, the cell array of the 3D non-volatile memory device of FIG. 4B includes first and second sub-blocks SB1 and SB2, which are distinguished from each other based on one or more dummy word lines.

For example, memory cells connected to first and second dummy word lines DWL1 and DWL2 and memory cells connected to word lines WL1 to WL4 between the first and second dummy word lines DWL1 and DWL2 may belong to the first sub-block SB1. Also, memory cells connected to third and fourth dummy word lines DWL3 and DWL4, and memory cells connected to word lines WL5 to WL8 between the third and fourth dummy word lines DWL3 and DWL4 may belong to the second sub-block SB2.

Therefore, among memory cells of each string, the memory cells connected to the word lines WL1 to WL4 belong to the first sub-block SB1, and the memory cells connected to the word lines WL5 to WL8 belong to the second sub-block SB2.

In order to distinguish the first sub-block SB1 from the second sub-block SB2, each string of the cell array of the 3D non-volatile memory device of FIG. 4B further includes at least one dummy memory cell connected between the memory cells of the first sub-block SB1 and the memory cells of the second sub-block SB2. The dummy memory cell may have the same type and specifications as other memory cells.

Figure 5:
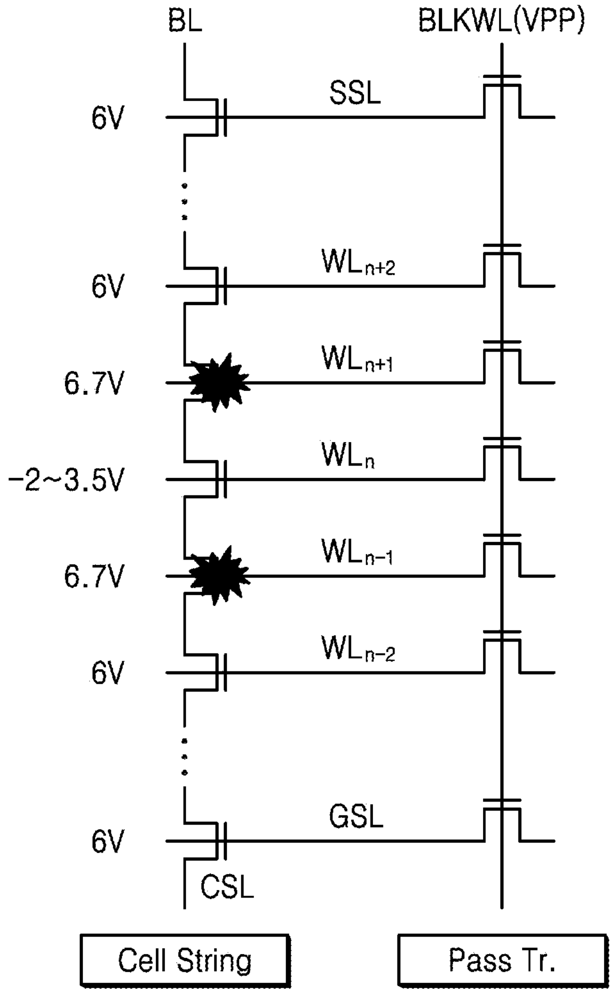
FIG. 5 shows an example of residual voltage of neighboring word lines according to a comparative example.

FIG. 5 shows an example of residual voltage of neighboring word lines according to a comparative example.

Referring to FIG. 5, a memory block in a read state is shown. The target word line corresponding to the read command may be the nth word line WLn. Neighboring word lines may include the remaining word lines $WL_{n-2}$, $WL_{n-1}$, $WL_{n+1}$, and $WL_{n+2}$ of a block BLK. In order to sense the target word line, a voltage at a high voltage level (e.g., a voltage level greater than a threshold voltage) may be applied to word lines adjacent to the target word line. Referring to FIG. 5, a high voltage of about 6 V may be applied to neighboring word lines, and a voltage of about 2 V to about 3.5 V may be applied to the target word line.

According to some implementations, read recovery of the target word line may be performed during a read process, and read recovery of adjacent word lines may not be performed. Accordingly, the voltage levels of neighboring word lines may be maintained high. If read operations are performed repeatedly at regular time intervals or if another read operation is not performed for a long period of time after a read operation, a distribution of a lower program state may shift to the right due to high voltage levels of neighboring word lines, and thus, reliability may deteriorate.

Figure 6:
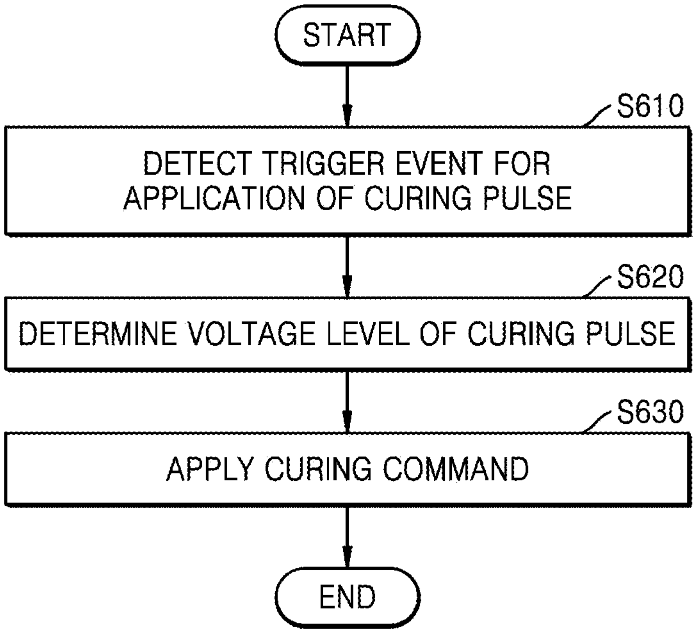
FIG. 6 is a flowchart showing a method of operating a storage controller, according to implementations.

FIG. 6 is a flowchart showing a method of operating the storage controller 210, according to some implementations.

Referring to FIG. 6, in operation S610, the storage controller 210 may detect a trigger event for applying a curing pulse. The trigger event may include all events in which the voltage levels of neighboring word lines adjacent to the target word line remain high or low. For example, the trigger event may include cases in which the non-volatile memory device 220 enters an idle state, a prescan is performed according to power on reset (POR), cold data is requested to be read, a wait queue of a command queue is 0, a timer reaches a threshold time after power-on, an interval read event occurs due to a periodic read request, or the like.

In operation S620, the storage controller 210 may determine the voltage level of the curing pulse. The pulse management circuit 211 of the storage controller 210 may determine the voltage level of the curing pulse on the basis of at least one of the previous operations and the voltage level of the word line. For example, the storage controller 210 may sense the voltage levels of neighboring word lines (e.g., the word lines $WL_{n+1}$ and $WL_{n-1}$ in FIG. 5). If the voltage level of the neighboring word line, sensed at the time when the read operation of the target word line is completed, exceeds a first threshold, the storage controller 210 may determine the voltage level of the curing pulse as a first level. If the sensed voltage level of the neighboring word line is less than the first threshold and greater than a second threshold, the storage controller 210 may determine the voltage level of the curing pulse as a second level. The second level may be less than the first level. The second threshold may be less than the first threshold. If the sensed voltage level of the neighboring word line is less than the second threshold and greater than a third threshold, the storage controller 210 may determine the voltage level of the curing pulse as a third level. The third level may be less than the second level. The third threshold may be less than the second threshold. In the implementations described above, there are three voltage levels of the curing pulse (e.g., the first level, the second level, and the third level) and three criteria for determining the voltage levels of the curing pulse (e.g., the first threshold, the second threshold, and the third threshold), but implementations are not limited thereto. The number of voltage levels of the curing pulse and the number of criteria for determining the voltage levels of the curing pulse may be variable.

In operation S630, the storage controller 210 may apply a curing command to the non-volatile memory device 220. The pulse management circuit 211 of the storage controller 210 may generate the curing command. The curing command may include information indicating the voltage level determined in operation S620. The pulse management circuit 211 may provide the generated curing command to the non-volatile memory device 220. The pulse generation circuit 221 of the non-volatile memory device 220 may select a voltage level to be applied to the memory cell array 310 on the basis of the information contained in the curing command. The pulse generation circuit 221 may provide the voltage generator 340 with the voltage control signal CTRL-_vol indicating the selected voltage level. The voltage generator 340 may apply the curing pulses to all word lines of the block corresponding to the target word line via the row decoder 350.

Figure 7:
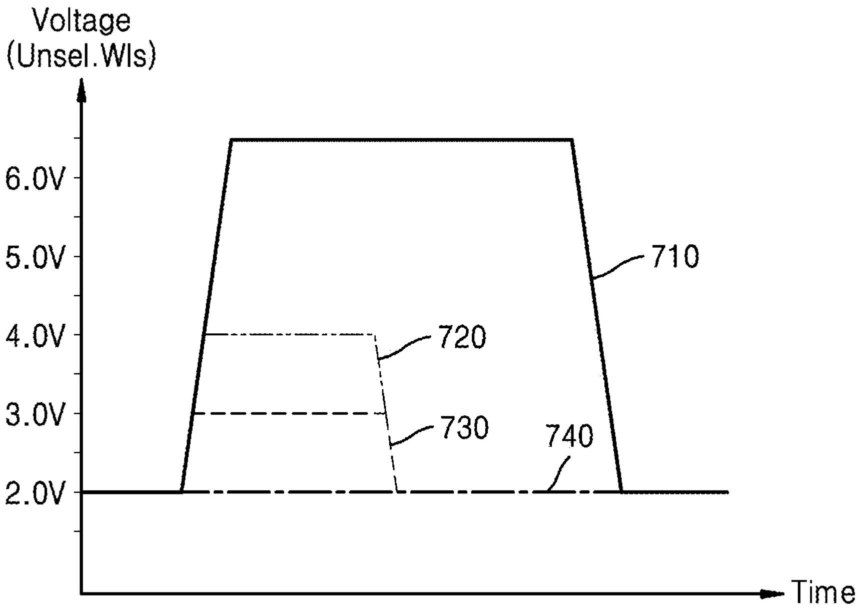
FIG. 7 shows an example of a curing pulse according to implementations.

FIG. 7 shows an example of a curing pulse according to implementations.

Referring to FIG. 7, pulses applied to a non-selected word line are shown. In a block, non-selected word lines may represent the remaining word lines other than a target word line corresponding to a read command.

A first pulse 710 may correspond to a pulse applied to a non-selected word line while a read voltage is applied to the target word line (e.g., the word line $WL_n$ in FIG. 5). For example, the voltage of about 2 V to about 3.5 V may be applied to the target word line in response to the read command. While the read command is applied, the voltage of 6.5 V may be applied to the non-selected word line.

A second pulse 720 may correspond to a pulse applied to the non-selected word line after the read operation of the target word line. Since a separate read recovery is not performed on the non-selected word line, the voltage level of the non-selected word line may remain high even after the target word line is read. Accordingly, the second pulse 720 may be applied to the non-selected word line to lower the voltage levels of the non-selected word lines. For example, when the voltage level of the sensed non-selected word line exceeds the first threshold, the storage controller 210 may determine that it is necessary to apply the curing pulse of the second pulse 720 to the non-selected word line.

A third pulse 730 may correspond to a pulse applied to the non-selected word line after the read operation of the target word line. The third pulse 730 may be applied to lower the voltage levels of the non-selected word lines. For example, when the voltage level of the sensed non-selected word line is less than the first threshold and greater than the second threshold, the storage controller 210 may determine that it is necessary to apply the curing pulse of the third pulse 730 to the non-selected word line. Herein, the first threshold may be greater than the second threshold.

A fourth pulse 740 may correspond to a pulse applied to the non-selected word line after the read operation of the target word line. The fourth pulse 740 may be applied to lower the voltage levels of the non-selected word lines. For example, when the voltage level of the sensed non-selected word line is less than the second threshold and greater than the third threshold, the storage controller 210 may determine that it is necessary to apply the curing pulse of the fourth pulse 740 to the non-selected word line. Herein, the second threshold may be greater than the third threshold.

According to implementations, the second pulse 720 to the fourth pulse 740 may have a pulse width less than that of the first pulse 710. The time required to recover the voltage of the non-selected word line may be shortened by applying a pulse for a shorter time than the first pulse 710 corresponding to the read command.

Figure 8:
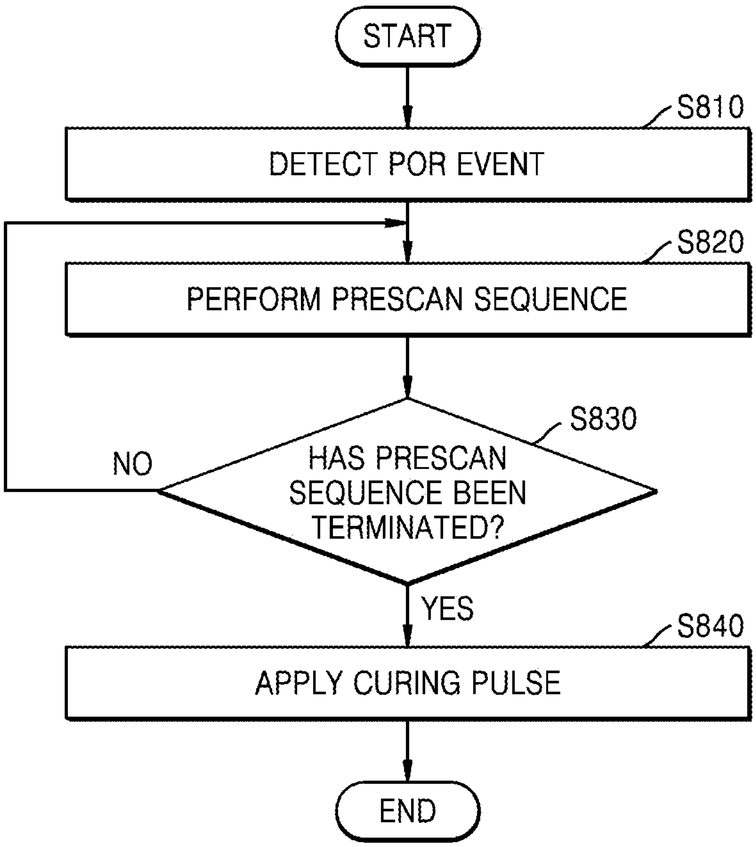
FIG. 8 is a flowchart showing a method of operating a storage controller, according to implementations.

FIG. 8 is a flowchart showing a method of operating the storage controller 210, according to some implementations.

Referring to FIG. 8, the storage controller 210 may detect a POR event in operation S810.

In operation S820, the storage controller 210 may perform a prescan sequence. The prescan is used to set the word line voltage to an expected value when performing a read operation in an initial power-on period by recovering the discharged word line to a constant voltage level (for example, $V_{DD}$ of 2.0 V).

In operation S830, the storage controller 210 may determine whether the prescan sequence has been terminated. For example, the storage controller 210 may sense the voltage level of the target word line. If the sensed voltage level does not reach the constant voltage level, the storage controller 210 may decide to repeat the prescan sequence and return to operation S820. On the other hand, when the voltage level of the target word line reaches the constant voltage level, the storage controller 210 may determine that the prescan sequence has ended.

In operation S840, the storage controller 210 may apply the curing pulse. The storage controller 210 may apply the curing pulse in response to the end of the prescan sequence. Herein, the curing pulse may be applied to all word lines of the block corresponding to the target word line on which the last prescan sequence has been performed. While the prescan sequence is repeatedly performed, a high level voltage is continuously applied to word lines adjacent to the target word line, and no separate recovery is performed. Accordingly, the voltage levels of adjacent word lines remain high. The storage controller 210 may lower the voltage levels of all word lines in the block by a certain voltage level by applying the curing pulses to all word lines.

Figure 9:
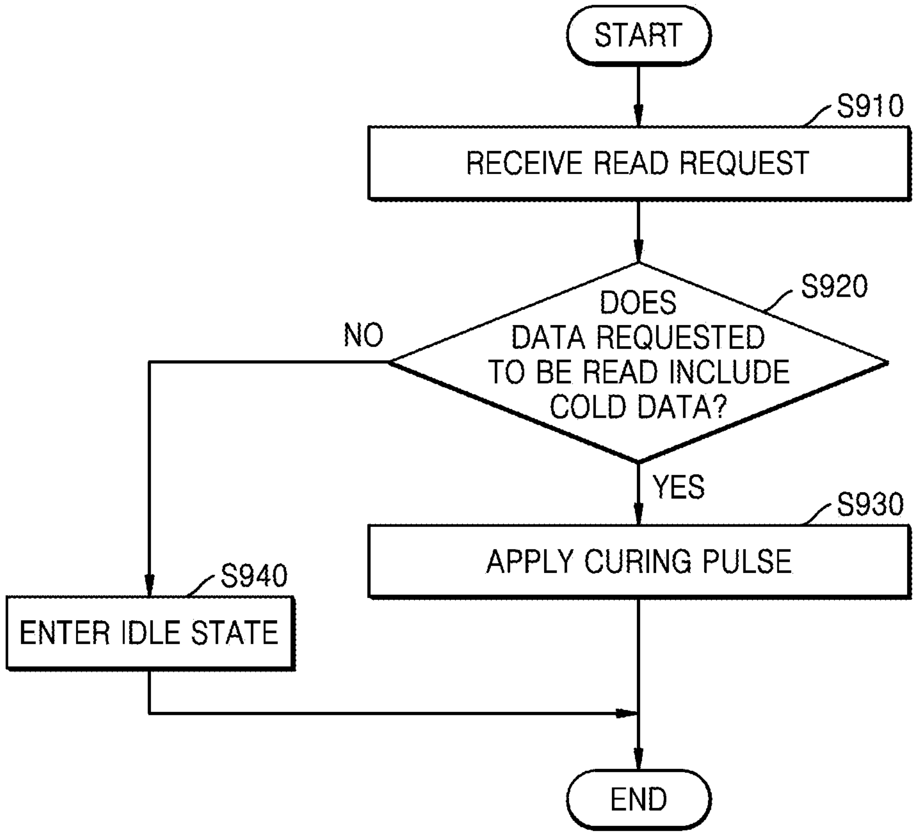
FIG. 9 is a flowchart showing a method of operating a storage controller, according to implementations.

FIG. 9 is a flowchart showing a method of operating the storage controller 210, according to implementations.

Referring to FIG. 9, the storage controller 210 may receive a read request in operation S910. For example, the storage controller 210 may receive the read command from the host 100.

In operation S920, the storage controller 210 may determine whether the data requested to be read corresponds to cold data. The cold data may represent data that is accessed rarely or used very infrequently. The storage controller 210 may determine whether the data corresponds the cold data on the basis of the address of the read command. Also, according to implementations, the host 100 may perform hot/cold data management. When requesting to read the cold data, the host 100 may transmit a separate indication representing the cold data to the storage controller 210 together with the read command. The storage controller 210 may determine, based on the indication, whether the data currently requested to be read corresponds to the cold data. If the data requested to be read is not cold data or the storage controller 210 does not receive the indication, the storage controller 210 may control the non-volatile memory device 220 to enter an idle state in operation S940.

In operation S930, the storage controller 210 may apply the curing pulse. The storage controller 210 may apply the curing pulse in response to a request for reading the cold data. Considering the characteristics of cold data, the block is not accessed for a long period of time after the read command requested in operation S910. Therefore, the voltage levels of neighboring word lines may not be recovered but remain at a high voltage level, which may cause a read disturbance. The storage controller 210 may apply the curing pulses to all word lines in a block of the target word line corresponding to the read request and thereby lower the voltage levels of all word lines by a certain voltage level.

Figure 10:
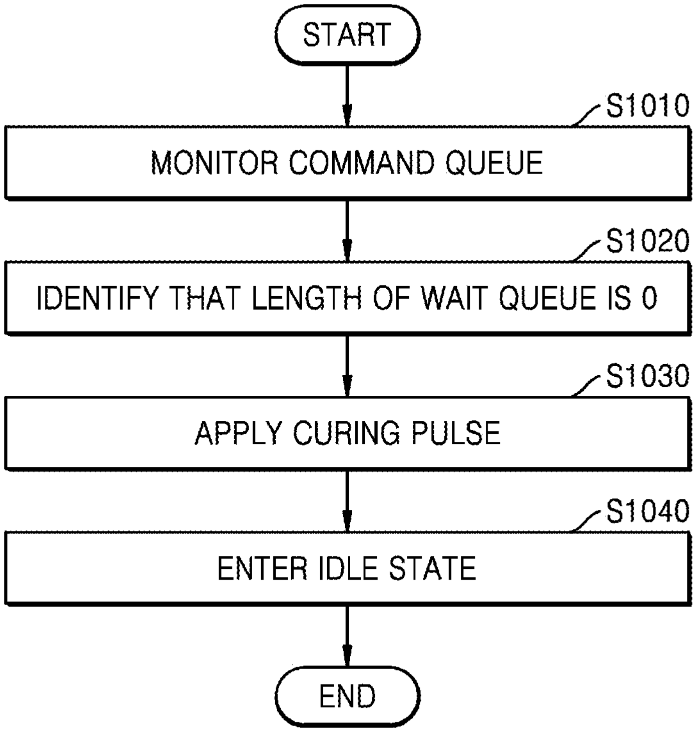
FIG. 10 is a flowchart showing a method of operating a storage controller, according to implementations.

FIG. 10 is a flowchart showing a method of operating the storage controller 210, according to implementations.

Referring to FIG. 10, the storage controller 210 may monitor a command queue in operation S1010. According to implementations, the storage controller 210 may further include a queue monitoring circuit. The queue monitoring circuit may monitor commands, which have not yet been processed but are waiting, among commands received from the host 100.

In operation S1020, the storage controller 210 may identify that the length of the wait queue is 0. For example, the queue monitoring circuit may not transmit a control signal to the pulse management circuit 211 if the length of the wait queue is not 0. Since there are commands that have not yet been processed, it may not be appropriate to apply a curing pulse. In another example, the queue monitoring circuit may provide a control signal to the pulse management circuit 211 if the length of the wait queue is 0. In response to the control signal, the pulse management circuit 211 may identify that there are no commands currently waiting and the idle state is created in the future.

In operation S1030, the storage controller 210 may apply the curing pulse. The storage controller 210 may apply the curing pulse in response to the control signal indicating that the length of the wait queue is 0. Since there are no waiting commands, the idle state may be formed immediately from the point of the control signal. However, when immediately entering the idle state, the voltage level of word lines adjacent to the target word line corresponding to the last read command may not be recovered and remain at a high voltage level, which may cause a read disturbance. The storage controller 210 may apply the curing pulses to all word lines in a block of the target word line corresponding to the last read command and thereby lower the voltage levels of all word lines by a certain voltage level.

The above implementations have been described only when the length of the wait queue is 0, but implementations are not limited thereto. According to various implementations, the queue monitoring circuit may determine whether the waiting commands include a read command, even if the length of the wait queue is not 0. The queue monitoring circuit may provide the pulse management circuit 211 with the control signal for applying a curing pulse when the waiting commands do not include a read command.

FIGS. 11A to 11D illustrate various examples of applying curing commands according to implementations.

In the above implementations, the storage controller 210 has been described as applying the curing pulses to all word lines of the block corresponding to the target word line, but the implementations are not limited thereto. According to various implementations, the storage controller 210 may apply the curing pulse to each of the sub-blocks or to specific word lines including at least one word line.

Figure 11A:
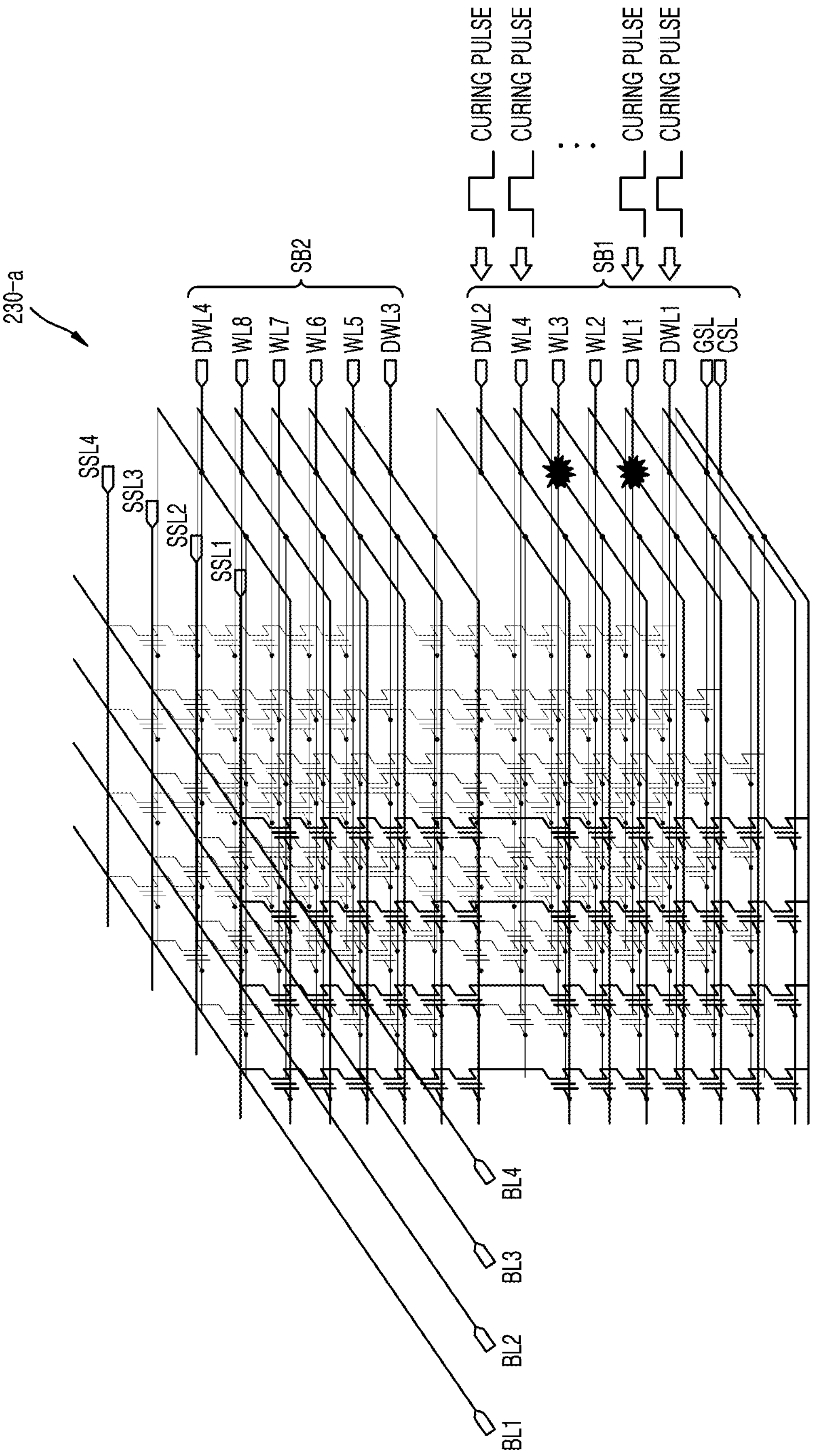
FIGS. 11A to 11D illustrate various examples of applying curing commands according to implementations.

Referring to FIG. 11A, the storage controller 210 may apply curing pulses to each of the sub-blocks. For example, a cell array 230-*a* in a 3D non-volatile memory device may include a first sub-block SB1 and a second sub-block SB2, and a target word line on which the last prescan sequence has been performed may correspond to a word line WL2. The storage controller 210 may apply curing pulses only to a sub-block including the target word line. That is, the storage controller 210 may apply the curing pulses to all word lines of the first sub-block SB1 corresponding to the word line WL2. On the basis of the curing pulse, the voltage levels of at least neighboring word lines adjacent to the word line WL2 in the first sub-block SB1 may be lowered to the voltage level of word line recovery. Accordingly, the threshold voltage corresponding to a lower program state of all word lines of the first sub-block SB1 may be prevented from rising to the right, and a read disturbance may be suppressed.

Figure 11B:
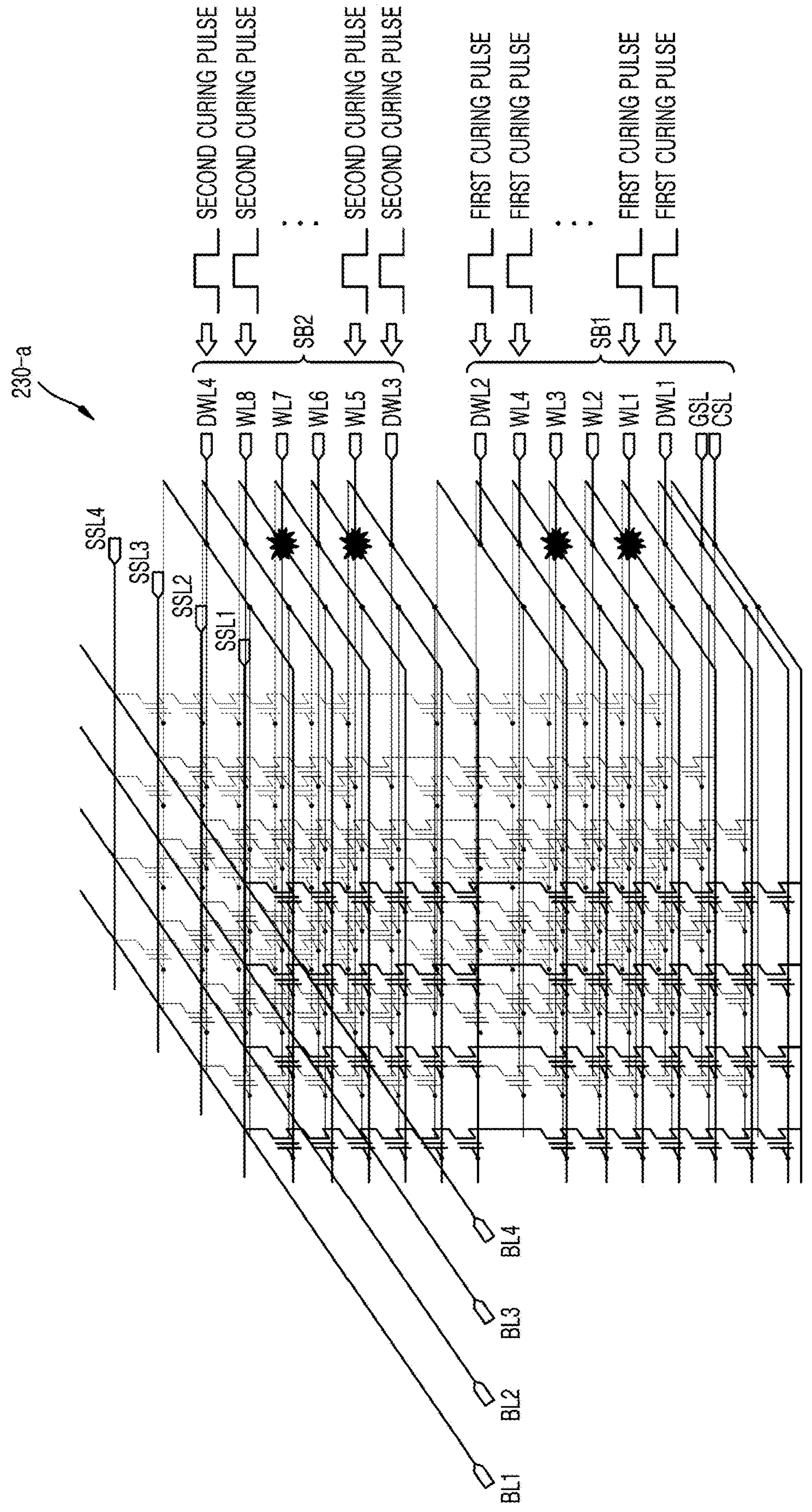

Referring to FIG. 11B, the storage controller 210 may apply different curing pulses to each of the sub-blocks. For example, the storage controller 210 may apply first curing pulses to the first sub-block SB1 and second curing pulses to the second sub-block SB2. Herein, the first curing pulse may be different from the second curing pulse. Referring to FIG. 7, for example, the first curing pulse may correspond to the second pulse 720 and the second curing pulse may correspond to the third pulse 730. According to some implementations, the first sub-block SB1 and the second sub-block SB2 may be addressed independently from each other. Therefore, the target word line on which the last prescan sequence has been performed in the first sub-block SB1 may correspond to a word line WL2, and the target word line on which the last prescan sequence has been performed in the second sub-block SB2 may correspond to a word line WL6. The storage controller 210 may apply the first curing pulse, which is the same as the second pulse 720, to the first sub-block SB1 corresponding to the word line WL2 and may apply the second curing pulse, which is the same as the third pulse 730, to the second sub-block SB2 corresponding to the word line WL6. On the basis of the first curing pulse, the voltage levels of at least neighboring word lines adjacent to the word line WL2 in the first sub-block SB1 may be lowered to the voltage level of word line recovery. On the basis of the second curing pulse, the voltage levels of at least neighboring word lines adjacent to the word line WL6 in the second sub-block SB2 may be lowered to the voltage level of word line recovery. Accordingly, the threshold voltage corresponding to the lower program state of all word lines in the first sub-block SB1 and the second sub-block SB2 may be prevented from rising to the right, and the read disturbance may be suppressed.

Figure 11C:
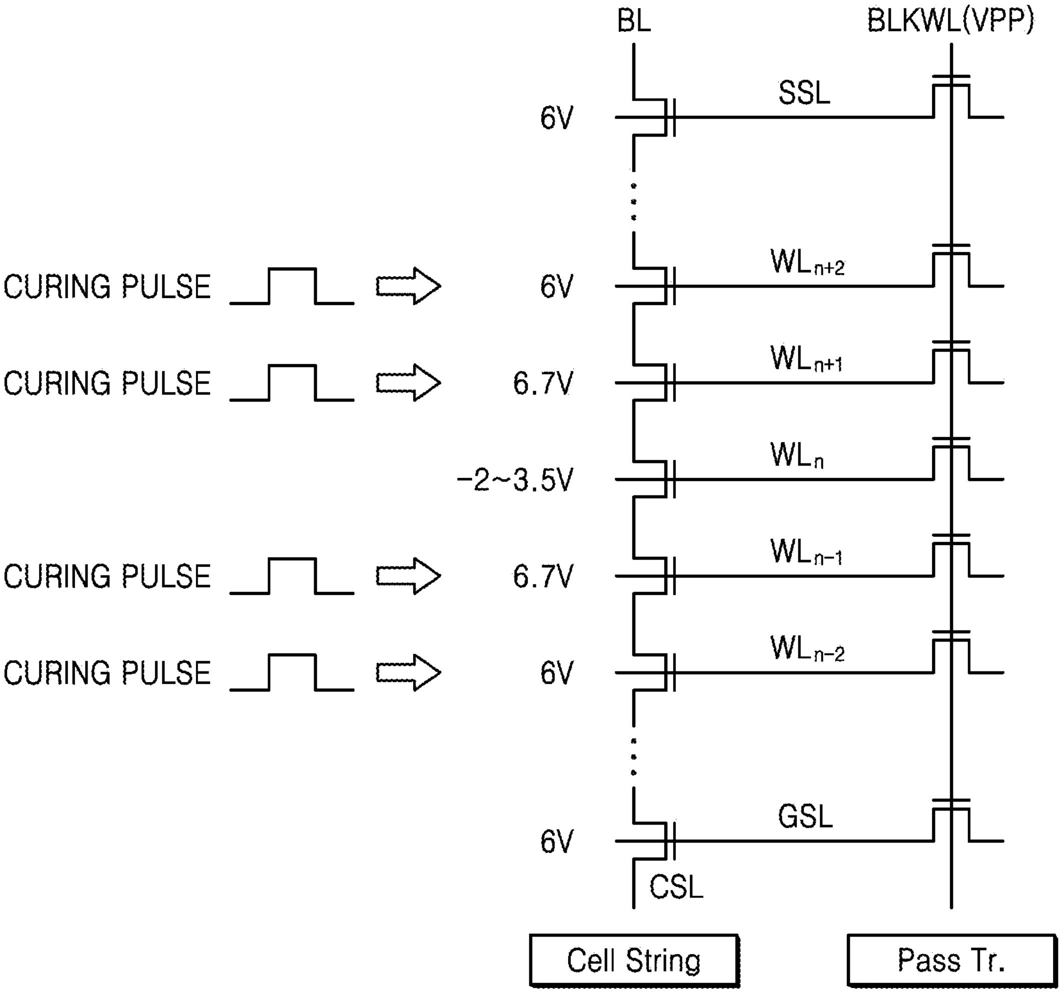

Referring to FIG. 11C, the storage controller 210 may apply the curing pulses to specific word lines including at least one word line. The at least one word line may include word lines that are somewhat spaced apart from a target word line $WL_n$. For example, the storage controller 210 may apply curing pulses to the word lines $WL_{n+2}$, $WL_{n+1}$, $WL_{n-1}$, and $WL_{n-2}$, which are spaced apart by 1 and 2 from the target word line $WL_n$. The above implementations are described as including only word lines spaced apart by 1 and 2 from the target word line $WL_n$, but implementations are not limited thereto. According to various implementations, the storage controller 210 may apply curing pulses to word lines spaced apart by N from the target word line $WL_n$, where N is a positive integer. For example, the storage controller 210 may apply curing pulses to word lines spaced apart by 2 from the target word line $WL_n$, that is, two word lines right next to the target word line $WL_n$. Also, the above implementations have been described in units of blocks, but implementations may be applied in units of sub-blocks in the same manner.

Figure 11D:
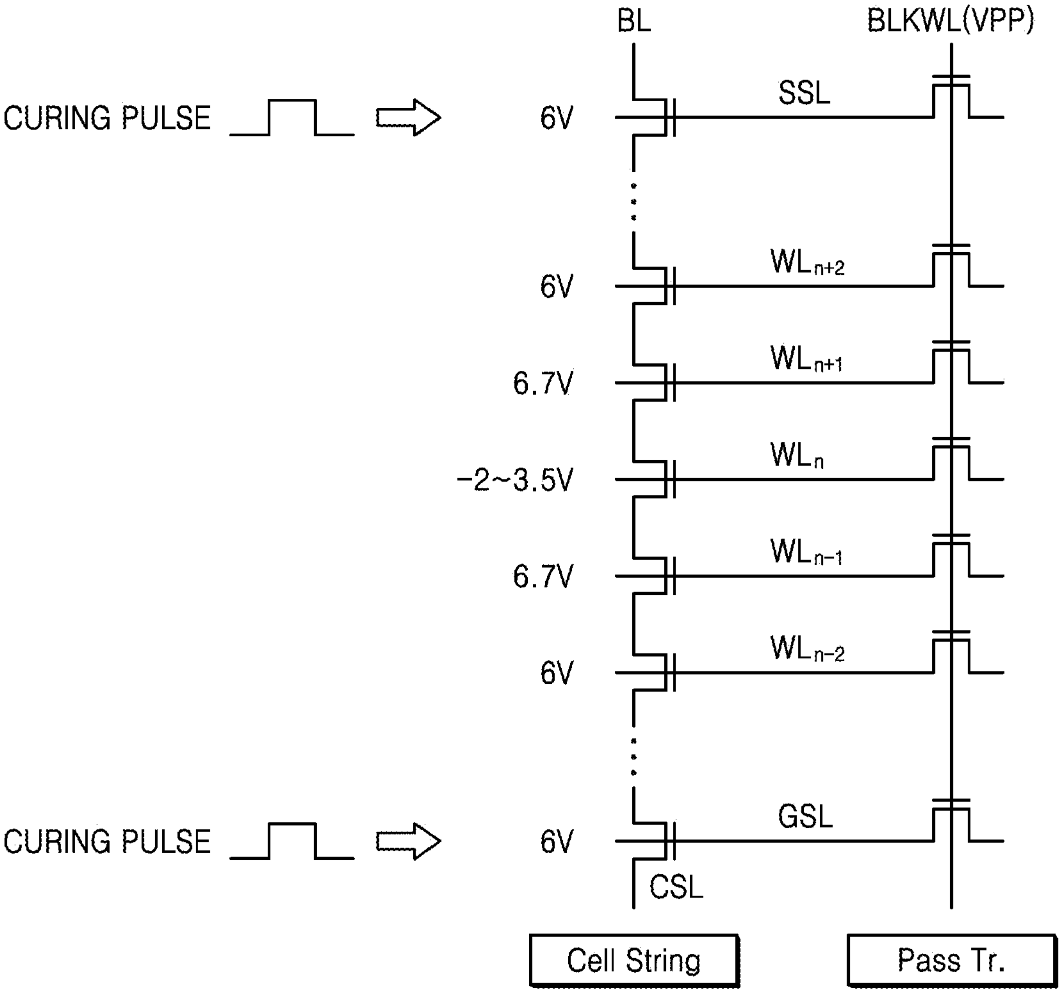

Referring to FIG. 11D, the storage controller 210 may apply the curing pulses to specific word lines including at least one word line. The at least one word line may include edge word lines of a block or sub-block corresponding to a target word line $WL_n$. For example, the at least one word line may include a top word line (e.g., $WL_{top\_edge}$) at the top and a bottom word line (e.g., $WL_{bott\_edge}$) at the bottom among all word lines in the block corresponding to the target word line $WL_n$. The storage controller 210 may prevent an edge word line disturbance by applying curing pulses to the edge word lines of the block or sub-block.

According to various implementations, the storage controller 210 may simultaneously apply the curing pulses to the edge word lines of the block or sub-block corresponding to the target word line and the word lines spaced apart by a certain number from the target word line. That is, the storage controller 210 may simultaneously apply the curing pulses according to FIGS. 11C and 11D.

Figure 12:
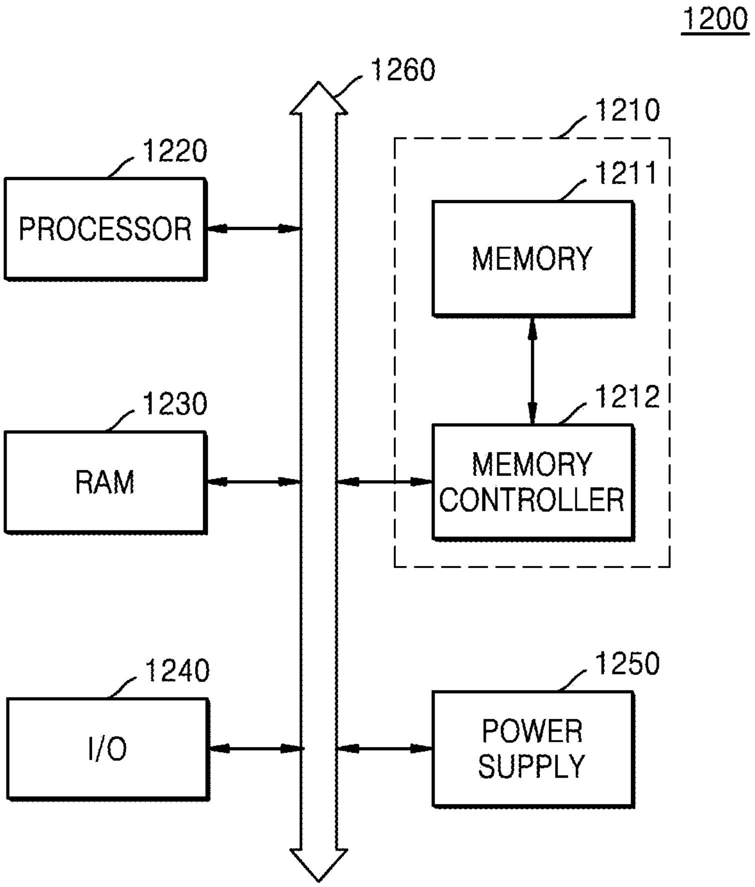
FIG. 12 is a block diagram illustrating a computing system including a non-volatile memory device according to implementations.

FIG. 12 is a block diagram illustrating a computing system 1200 including a non-volatile memory device according to implementations.

Referring to FIG. 12, the computing system 1200 may include a memory system 1210, a processor 1220, RAM 1230, an input/output (I/O) device 1240, and a power supply 1250. The computing system 1200 may further include ports capable of communicating with a video card, a sound card, a memory card, a universal serial bus (USB) device, or other electronic devices. The computing system 1200 may be provided as a personal computer or as a portable electronic device, such as a laptop computer, a mobile phone, a PDA, and a camera.

The processor 1220 may perform specific calculations or tasks. According to implementations, the processor 1220 may include a microprocessor or a CPU. The processor 1220 may communicate with the RAM 1230, the I/O device 1240, and the memory system 1210 via a bus 1260, such as an address bus, a control bus, and a data bus. The processor 1220 may also be connected to an extension bus, such as a peripheral component interconnect (PCI) bus.

The memory system 1210 may include a non-volatile memory device 1211 provided in the example implementations shown in FIGS. 1 to 11D. According to implementations, the non-volatile memory device 1211 may prevent a read disturbance and thus exhibit improved reliability.

The I/O device 1240 may include input means, such as a keyboard, a keypad, and a mouse, and output means, such as a printer and a display. The power supply 1250 may supply operating voltage required for operation of the computing system 1200.

Figure 13:
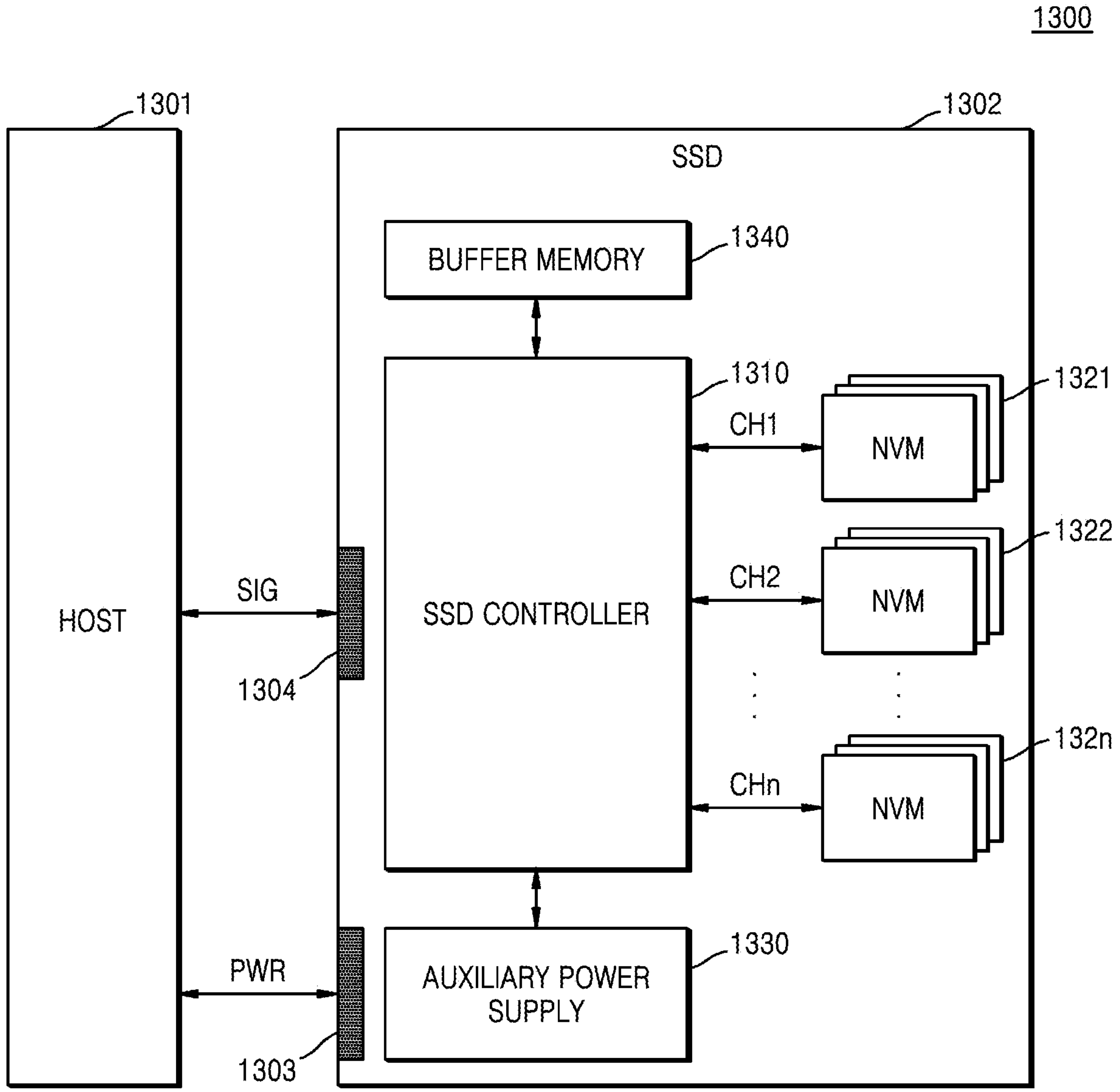
FIG. 13 is a block diagram showing a solid state drive (SSD) system to which a storage device according to the inventive concept is applied.

FIG. 13 is a block diagram showing a solid state drive (SSD) system 1300 to which a storage device according to the inventive concept is applied.

Referring to FIG. 13, the SSD system 1300 includes a host 1301 and an SSD 1302.

The SSD 1302 exchanges a signal SIG with the host 1301 via a signal connector 1304 and receives power PWR via a power connector 1303. The SSD 1302 may include an SSD controller 1310, a plurality of flash memories 1321 to **132*n*, an auxiliary power supply 1330, and a buffer memory 1340**.

The SSD controller 1310 may control the plurality of flash memories 1321 to **132*n* in response to the signal SIG received from the host 1301 through channels CH1 to CHn. The plurality of flash memories 1321 to 132*n* may operate under the control by the SSD controller 1310. The auxiliary power supply 1330 is connected to the host 1301 via the power connector 1303. The auxiliary power supply 1330 may receive the power PWR from the host 1301 and perform a charging operation. The auxiliary power supply 1330 may provide power to the SSD 1302 when power from the host 1301 is not supplied smoothly. The buffer memory 1340 operates as a buffer memory of the SSD 1302**.

For example, the SSD controller 1310 may include a pulse management circuit as described with reference to FIGS. 1 to 12. Each of the plurality of flash memories 1321 to **132*n* may include a pulse generation circuit as described with reference to FIGS. 1 to 12. The pulse generation circuit may be provided in a non-volatile memory of each of the plurality of flash memories 1321 to 132*n*. Alternatively, the pulse management circuit may be provided in an interface chip of each of the plurality of flash memories 1321 to 132*n***.

When a trigger event (e.g., cold data, a wait queue with 0, or an interval read command, etc.) occurs due to long-term neglect after the read command, the SSD controller 1310 may lower the voltage of neighboring word lines by applying curing pulses to all word lines of the block corresponding to the target word line, thereby preventing a read disturbance and improving reliability.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the memory device and operating method thereof have been particularly shown and described with reference to implementations thereof, it will be understood that various changes in form and details may be made therein without departing from the spirit and scope of the following claims.

What is claimed is:

1. A method of operating a storage device comprising a storage controller and non-volatile memories, the method comprising:

detecting a trigger event for application of a curing pulse;

determining a voltage level of the curing pulse; and applying a curing command instructing generation of the curing pulse according to the determined voltage level, wherein the trigger event corresponds to an event in which a block or sub-block comprising a target word line is expected not to be accessed for more than a predefined period of time after a read operation on the target word line is completed, the curing pulse corresponds to a voltage pulse applied to at least one word line of a block or sub-block comprising the target word line on which the read operation has been performed, and the voltage level of the curing pulse is less than a read voltage.

2. The method of claim 1, wherein applying the curing command comprises:

identifying whether data requested to be read comprises cold data; and applying the curing pulse to at least one word line of a block or sub-block corresponding to the cold data when the data requested to be read comprises the cold data or skipping application of the curing pulse and putting the non-volatile memories into an idle state when the data requested to be read does not comprise the cold data.

3. The method of claim 1, wherein the determining of the voltage level of the curing pulse comprises:

sensing a voltage level of a neighboring word line adjacent to the target word line; and determining the voltage level of the curing pulse as a first level when the sensed voltage level is greater than a first threshold, determining the voltage level of the curing pulse as a second level lower than the first level when the sensed voltage level is less than the first threshold and greater than a second threshold, or determining the voltage level of the curing pulse as a third level lower than the second level when the sensed voltage level is less than the second threshold and greater than a third threshold.

4. The method of claim 1, wherein the trigger event comprises a power on reset event, and applying the curing command comprises:

performing a prescan sequence;

determining that the prescan sequence has been terminated; and applying the curing pulse to at least one word line of a block or sub-block on which the prescan sequence has been performed, when the prescan sequence has been terminated.

5. The method of claim 1, wherein the trigger event comprises a case in which a length of a wait queue is 0, and applying the curing command comprises:

monitoring a command queue; and applying the curing pulse to at least one word line of a block or sub-block of a target word line corresponding to a last read command in response to the length of the wait queue being 0.

6. The method of claim 1, wherein the at least one word line corresponds to any one of an edge word line of a block or sub-block corresponding to the target word line, word lines spaced apart from the target word line by N, where N is a positive integer, and all word lines of the block or sub-block corresponding to the target word line.

7. The method of claim 1, wherein the trigger event comprises putting the non-volatile memories into an idle state, and applying the curing command comprises applying the curing pulse to at least one word line in a block or sub-block of a target word line corresponding to a last performed read command in response to the non-volatile memories being put into the idle state.

8. A storage device comprising:

non-volatile memories; and a storage controller comprising a pulse management circuit configured to detect a trigger event for application of a curing pulse, determine a voltage level of the curing pulse, and apply a curing command instructing generation of the curing pulse according to the determined voltage level, wherein the trigger event corresponds to an event in which a block or sub-block comprising a target word line is expected not to be accessed for more than a predefined period of time after a read operation on the target word line is completed, and the curing pulse corresponds to a voltage pulse applied to at least one word line in a block or sub-block comprising the target word line on which the read operation has been performed.

9. The storage device of claim 8, wherein the storage controller is further configured to:

identify whether data requested to be read comprises cold data;

apply the curing pulse to at least one word line of a block or sub-block corresponding to the cold data when the data requested to be read comprises the cold data; and skip application of the curing pulse and put the non-volatile memories into an idle state when the data requested to be read does not comprise the cold data.

10. The storage device of claim 8, wherein the storage controller is further configured to:

sense a voltage level of a neighboring word line adjacent to the target word line;

determine the voltage level of the curing pulse as a first level when the sensed voltage level is greater than a first threshold;

determine the voltage level of the curing pulse as a second level lower than the first level when the sensed voltage level is less than the first threshold and greater than a second threshold; and determine the voltage level of the curing pulse as a third level lower than the second level when the sensed voltage level is less than the second threshold and greater than a third threshold.

11. The storage device of claim 8, wherein the trigger event comprises a power on reset event, and wherein the storage device is configured to:

perform a prescan sequence;

determine whether the prescan sequence has been terminated; and apply the curing pulse to at least one word line of a block or sub-block on which the prescan sequence has been performed, when the prescan sequence has been terminated.

12. The storage device of claim 8, wherein the storage controller further comprises a queue monitoring circuit, the trigger event comprises a case in which a length of a wait queue is 0, the queue monitoring circuit is configured to monitor a command queue, and the storage controller is configured to apply the curing pulse to at least one word line of a block or sub-block of a target word line corresponding to a last read command in response to the length of the wait queue being 0.

13. The storage device of claim 8, wherein the at least one word line corresponds to any one of an edge word line of a block or sub-block corresponding to the target word line, word lines spaced apart from the target word line by N, where N is a positive integer, and all word lines of the block or sub-block corresponding to the target word line.

14. The storage device of claim 8, wherein the trigger event comprises putting the non-volatile memories into an idle state, and the storage controller is configured to apply the curing pulse to at least one word line in a block or sub-block of a target word line corresponding to a last performed read command in response to the non-volatile memories being put into the idle state.

15. A storage system comprising:

a host device configured to generate a read command; and a storage device comprising non-volatile memories and configured to detect a trigger event for application of a curing pulse, determine a voltage level of the curing pulse, and apply a curing command instructing generation of the curing pulse according to the determined voltage level, wherein the trigger event corresponds to an event in which a block or sub-block comprising a target word line is expected not to be accessed for more than a predefined period of time after a read operation on the target word line is completed, the curing pulse corresponds to a voltage pulse applied to at least one word line in a block or sub-block comprising the target word line on which the read operation has been performed, the at least one word line corresponds to any one of an edge word line of a block or sub-block corresponding to the target word line, word lines spaced apart from the target word line by N, where N is a positive integer, and all word lines of the block or sub-block corresponding to the target word line, the voltage level of the curing pulse is less than a read voltage, and a pulse width of the curing pulse is less than that of a pulse applied to neighboring word lines according to the read command.

16. The storage system of claim 15, wherein the storage device is further configured to:

identify whether data requested to be read comprises cold data;

apply the curing pulse to at least one word line of a block or sub-block corresponding to the cold data when the data requested to be read comprises the cold data; and skip application of the curing pulse and put the non-volatile memories into an idle state when the data requested to be read does not comprise the cold data.

17. The storage system of claim 15, wherein the storage device is further configured to:

sense a voltage level of a neighboring word line adjacent to the target word line;

determine the voltage level of the curing pulse as a first level when the sensed voltage level is greater than a first threshold;

determine the voltage level of the curing pulse as a second level lower than the first level when the sensed voltage level is less than the first threshold and greater than a second threshold; and determine the voltage level of the curing pulse as a third level lower than the second level when the sensed voltage level is less than the second threshold and greater than a third threshold.

18. The storage system of claim 15, wherein the trigger event comprises a power on reset event, and the storage device is configured to:

perform a prescan sequence;

determine whether the prescan sequence has been terminated; and apply the curing pulse to at least one word line of a block or sub-block on which the prescan sequence has been performed, when the prescan sequence has been terminated.

19. The storage system of claim 15, wherein the trigger event comprises a case in which a length of a wait queue is 0, and the storage device is configured to monitor a command queue and apply the curing pulse to at least one word line of a block or sub-block of a target word line corresponding to a last read command in response to the length of the wait queue being 0.

20. The storage system of claim 15, wherein the trigger event comprises putting the non-volatile memories into an idle state, and the storage device is configured to apply the curing pulse to at least one word line in a block or sub-block of a target word line corresponding to a last performed read command in response to the non-volatile memories being put into the idle state.

* * * * *